United States Patent [19]

Butler, III

[11] 4,219,746
[45] Aug. 26, 1980

[54] BI-DIRECTIONAL AXIAL FLOW BLOWER FOR PUMP-STORAGE HYDROGENERATORS

[75] Inventor: John M. Butler, III, Penn Hills, Pa.

[73] Assignee: Westinghouse Electric Corp., Pittsburgh, Pa.

[21] Appl. No.: 941,994

[22] Filed: Sep. 13, 1978

Related U.S. Application Data

[63] Continuation of Ser. No. 804,427, Jun. 7, 1977, abandoned.

[51] Int. Cl.² .............................................. H02K 1/32
[52] U.S. Cl. ......................................... 310/61; 310/65
[58] Field of Search ................................... 310/52–65, 310/260, 262, 270, 162; 290/52

[56] References Cited

U.S. PATENT DOCUMENTS

| | | | |
|---|---|---|---|
| 876,568 | 1/1908 | Lord | 310/64 |
| 1,853,646 | 4/1932 | Vonkando | 310/54 |
| 1,959,527 | 5/1934 | Ehrmann | 310/54 |
| 2,724,064 | 11/1955 | Kilner | 310/61 |
| 2,728,001 | 12/1955 | Gunthardt | 310/64 |
| 3,183,384 | 5/1965 | Flaherty | 310/54 |
| 3,272,129 | 9/1966 | Leopold | 417/350 |
| 3,748,508 | 7/1973 | Lang | 310/53 |
| 3,809,934 | 5/1974 | Baer | 310/62 |
| 3,969,643 | 7/1976 | Säpper | 310/58 |

Primary Examiner—R. Skudy
Attorney, Agent, or Firm—J. W. Keen

[57] ABSTRACT

Axial flow blowers for cooling the rotatable field winding on synchronous dynamoelectric machines. An axial flow blower is provided on each axial end of the dynamoelectric machine. Each blower includes an inboard and an outboard section. Each section is capable of forcing a gas coolant through interpolar spaces which separate the poles on synchronous motors and generators. A flow guide is arranged in each interpolar space to direct the gas coolant against the adjacent field winding. One inboard section causes axial flow of the gas coolant through the interpolar spaces when the shaft of the dynamoelectric machine is rotated in a first direction and the other inboard section causes axial flow of the gas coolant in the opposite direction when the shaft is rotated in the second direction. The inboard sections are so designed that when they are rotating in their non-blowing direction of rotation, they extract minimum total pressure from the axially-propelled gas coolant forced towards them by the other inboard section and both outboard sections. The outboard sections provide axial flow of gas coolant through the interpolar spaces during both rotational directions of the shaft. Changing rotational direction in applications such as pump storage hydrogenerators requires such bi-directional axial flow blowers.

7 Claims, 5 Drawing Figures

BI-DIRECTIONAL AXIAL FLOW BLOWER FOR PUMP-STORAGE HYDROGENERATORS

This is a continuation of application Ser. No. 804,427, filed June 7, 1977, now abandoned.

BACKGROUND OF THE INVENTION

1. Field of the Invention

This invention relates to gas-cooled field windings of synchronous dynamoelecric machines, and more particularly, to means for cooling those gas-cooled windings by use of dual axial flow blowers, each of which actively function for one rotational direction of the dynamoelectric machines.

2. Description of the Prior Art

Large inner-cooled hydrogenerators often use a gas coolant for the field winding in end ventilated machines and rim ventilated machines. End ventilated machines are provided with radial vents in the stator so that coolant gas enters both ends of the rotor, passes between the rotor poles into the air gap between the rotor and the stator, and then through radially disposed stator vents. End ventilated machines have a centrifugal blower attached to the rotor on each axial end while the rim ventilated machines function by having radial openings formed in the rotor which cause the rotor to act as a radial flow centrifugal blower forcing the air through the rim openings and into the interpolar space where it contacts the field winding.

Disadvantages of the rim ventilated machines include coolant pressure limitations inherent in single stage radial-flow blowers and a smaller effective stress area for the rotor rim due to the formation of radial vent openings. End ventilated machines usually have single stage centrifugal blowers due to the fact that staging centrifugal blowers requires complex machining, is expensive, and impractical due to axial space limitations imposed on many dynamoelectric machines such as pump-storage hydrogenerators. Thus, centrifugal blowers on end ventilated designs encounter a coolant pressure limitation as did the rim ventilated design.

The low pressure developed by end ventilated and rim ventilated designs limit the coolant flow velocity passing the field winding resulting in a motor-generator whose power rating is constrained by the high temperature existing in the field winding. Desirable features on rotatively reversible dynamoelectric machines such as hydrogenerators include increased coolant pressure and velocity to allow significant up-rating for dynamoelectric machines of any given size while retaining their capability of cooling the field winding for each rotational direction. A further desirable characteristic would be to decrease the stresses now experienced by the rotor rim on machines utilizing rim ventilation.

SUMMARY OF THE INVENTION

In accordance with the present invention, an improved cooling scheme for the field winding on synchronous dynamoelectric machines is provided for increasing the coolant velocity thereto and decreasing the winding temperature for a rotatively reversible shaft such as is utilized in a pump-storage hydrogenerator. The invention generally comprises a multiple stage axial flow blower on each end of a reversibly rotatable shaft with the shaft having a field winding distributed thereon around a number of poles which are separated on the shaft by a number of interpolar spaces. Each blower has an outboard section which compresses elastic fluid for either rotational direction of the shaft. Each blower also has an inboard section which compresses elastic fluid when rotated in the appropriate direction. Each axial flow blower propels an elastic fluid coolant toward the opposite axial end of the shaft when the shaft is rotated in a direction consistent with the compressing capability of that blower's inboard section. When the shaft is rotated in a direction causing one blower's inboard section to compress, the other blower's inboard section is adapted to extract the minimum possible pressure from the coolant fluid directed thereto through the interpolar spaces by the first blower.

The axial flow blowers are in fluid communication through a conduit which connects their axially opposite outboard ends. During shaft rotation, the elastic coolant's circulation path extends from the outboard section of one axial blower, through the inboard section of the same blower, through the interpolar spaces, through the inboard section of the other axial flow blower, through the outboard section of the other blower, through the connecting conduit, and returns to the outboard section of the first axial flow blower.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
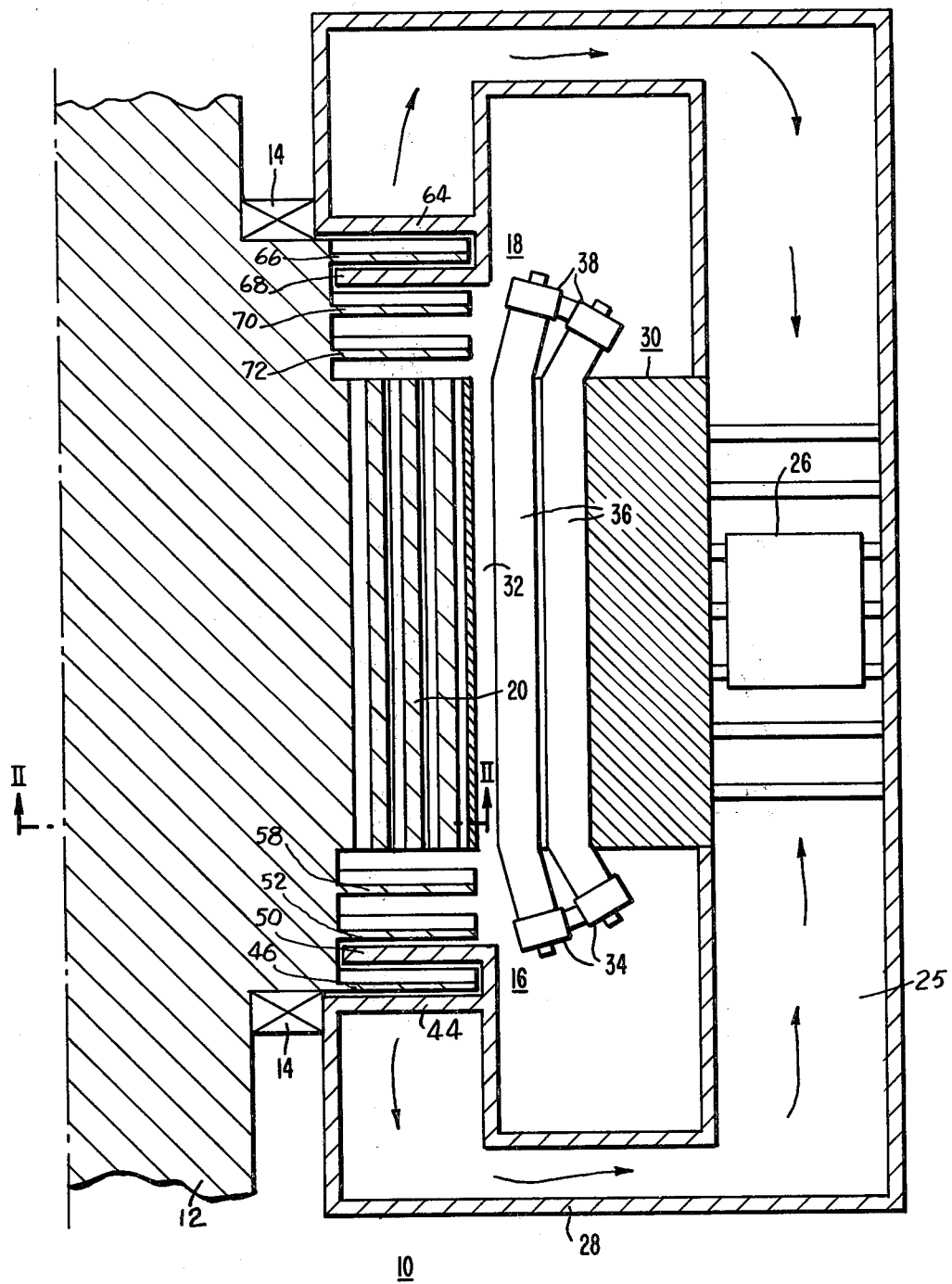
FIG. 1 is a sectional view of an exemplary hydrogenerator in which the invention is incorporated.

FIG. 1 illustrates a sectional view of a hydrogenerator 10 divided, for convenience sake, along the center line of shaft 12. In pump-storage applications, shaft 12 is rotatively reversible allowing generator 10 to function either as a water-wheel driven generator or an electric motor which drives a pump. Shaft 12 is supported by bearings 14 which are suitable for shaft 12 rotation in either direction. Axial flow blowers 16 and 18 are illustrated on opposite axial ends of field winding region 20. Field winding 20 is wrapped about a number of poles 22 each pair of which is separated by an interpolar space 24 which is better illustrated in FIG. 2. When shaft 12 is rotated in a clockwise direction, by example, blower 16 forces coolant such as air into interpolar spaces 24 which direct the coolant axially along the field winding 20 toward the opposite axial flow blower 18. Axial flow blower 18 is designed to extract minimum work and dynamic pressure from the coolant while supplying additional static pressure thereto.

Coolant fluid then exits blower 18 and travels along the dashed line to the entrance row of blades on blower 16. The coolant gas, in passing through a conduit 25 between blower 18 and blower 16, travels through cooler 26 which removes heat from the coolant gas which that coolant gas previously absorbed from field winding 20. Although cooler 26 is illustrated as being integral within outer casing 28, it is to be understood that cooler 26 may be external to the casing or even non-existent if the axial flow blowers are sufficiently removed from each other and can access relatively cool atmospheric air on each end while exhausting the heat laden air on the opposite axial end. FIG. 1 illustrates a stator member 30 separated from field winding 20 by air gap 32. The illustrated stator member 30 is cooled by supplying headers 34 with a second coolant which is forced through axially extending openings in the stator winding 36 causing that coolant to remove heat from the stator winding and exit through outlet headers 38. For counterclockwise rotation of shaft 12, axial flow blower 18 drives the coolant in the opposite axial direction toward axial flow blower 16 and then along the dashed line in the opposite direction as previously described.

Figure 2:
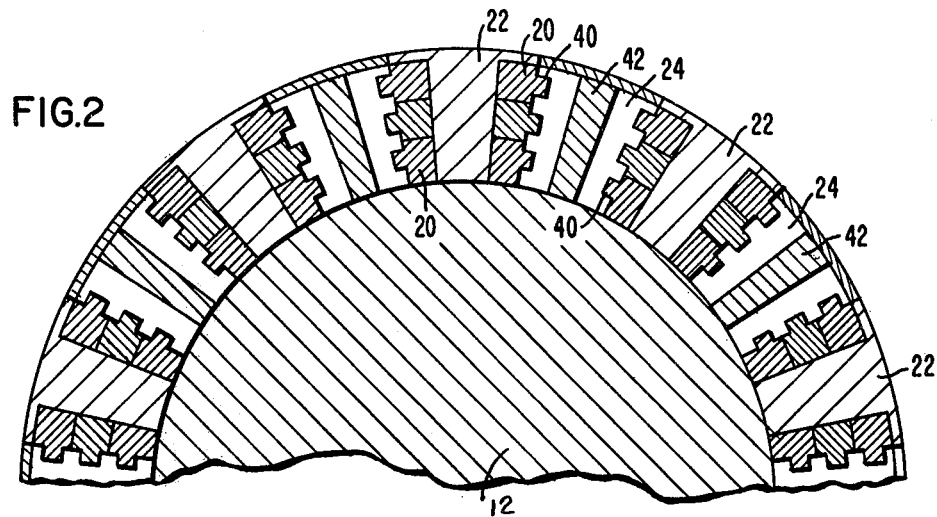
FIG. 2 is a sectional view taken along section line II—II shown in FIG. 1.

FIG. 2 is a sectional view taken along section line II—II as shown in FIG. 1. Shaft 12 has poles 22 disposed thereon at predetermined arcuate intervals. The field winding 20 is wrapped about said poles 22 which have fins 40 protruding transversely therefrom and extending axially parallel with poles 22. Fins 40 on circumferentially adjacent poles are separated by an arcuate distance 24 known as an interpolar space. To increase the heat transfer rate between fins 40 of the field winding and the coolant fluid propelled axially through interpolar space 24, a flow guide 42 is disposed between fins 40 and is tapered in the radial direction so as to increase the Reynolds number of the coolant fluid and provide a uniform, cross-sectional coolant flow area past each fin 40.

Figure 3:
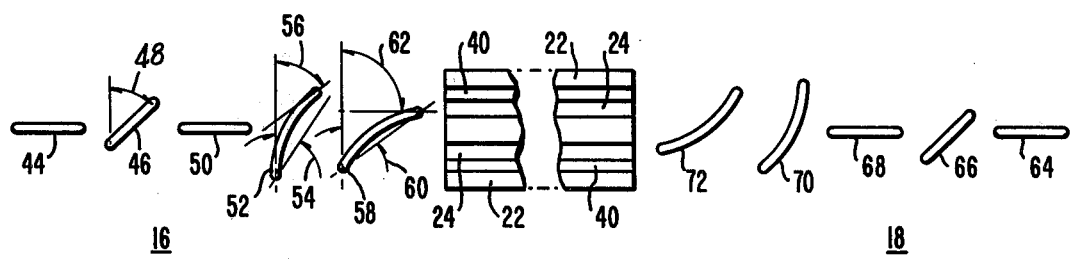
FIG. 3 is a schematic of how the axial flow blowers are disposed on either end of the pole region on the shaft.
Figure 4A:
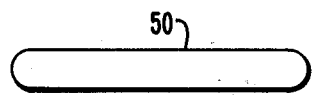
FIGS. 4A and 4B are elevation views of a straight and a cambered blade, respectively, such as are utilized in the present invention.
Figure 4B:
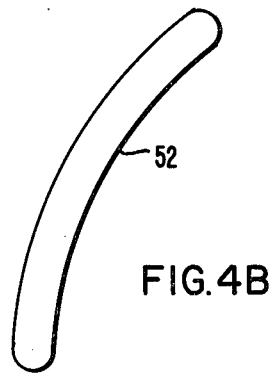

FIG. 3 is a schematic diagram of the five axial rows of blades in axial blowers 16 and 18. The blowers are situated on each axial end of poles 22. Flow guide 42 arcuately separates the circumferentially adjacent poles and their attached fins 40. Row 44 of axial blower 16 comprises straight blades which are better illustrated in FIG. 4A and are situated at an angle of 0° to the flow of coolant gas. Row 46 is made up of straight blades, but are arranged at an angle 48 of 47° by example. Row 50 comprises straight blades identical with that of row 44. Row 52 is made up of rotatable cambered blades whose leading edges are at an angle 54 of 35° and whose trailing edges are at an angle of 54°. Blade row 58 consists of rotatable cambered blades whose leading edges are at an angle 60 of 54° and whose trailing edges are at an angle 62 of 90°. In blower 16 only blade rows 46, 52, and 58 are attached to shaft 12. Row 64 is identical to row 44, row 66 is identical to row 46, row 68 is identical to row 50, and rows 70 and 72 are identical to rows 52 and 58, respectively, with the exception that the cambers of rows 70 and 72 curve away from their cords in the opposite directions from blade rows 52 and 58. An example of the cambered blades is shown in FIG. 4B. Blade rows 44, 50, 60, and 68 are stationary while rows 46, 52, 58, 66, 70, and 72 are rotatable.

Stationary blade rows 44, 50, and rotatable blade row 46 constitute a first outboard section and stationary blade rows 64, 68 and rotatable blade row 66 together constitute a second outboard section of axial flow blowers 16 and 18 and have compressing capability for either rotational direction of shaft 12. Rotatable blade rows 52, 58 and 70, 72 respectively make up a first and second inboard sections of blowers 16 and 18 with the inboard sections of opposite blowers having compressing capability for opposite shaft rotational direction.

Blades in row 44 are two inches in width in the axial direction while blades in row 46 occupy 1.46 inches in the axial direction. Blades in row 50 occupy two inches in the axial direction, blades in row 52 occupy 1.6 inches in the axial direction, and blades in row 58 occupy two inches in the axial direction with all rows being separated by an axial distance of 0.5 inches. It is to be understood that the dimensions of the blades, their arrangement on the shaft, and the number of stages given is by example only and applies to a particular machine of the assignee of the present invention. The specific sizes, shapes, and arrangement of the blades will depend on the particular machine in which this invention is to be utilized since the coolant flow rate, axial pressure drop, rotation speed, and number of poles on the machine will cause the previously-mentioned parameters to change accordingly.

I claim:

1. A synchronous dynamoelectric machine comprising:

a shaft having a first and a second end, said shaft being rotatable about its axis in either direction;

a field winding distributed about a plurality of poles which are disposed on said shaft in alternating relationship with a plurality of interpolar spaces each of which extend axially along said shaft;

a casing member surrounding said shaft and providing support therefor;

a first series of blades including stationary blade rows and rotatable blade rows situated radially about the first end of said shaft, said rotatable blades being attached to said shaft so as to rotate therewith, each of said stationary blade rows being supported by said casing and being axially adjacent at least one rotatable blade row, said blades axially forcing an elastic coolant through said interpolar spaces to the second end of said shaft when said shaft is rotated in a first direction; and a second series of blades including stationary blade rows and rotatable blade rows situated radially about the second end of said shaft, said rotatable blades being attached to said shaft so as to rotate therewith, each of said stationary blade rows being supported by said casing and being axially adjacent at least one rotatable blade row, and blades axially forcing an elastic coolant through said interpolar spaces to said shaft's first end when said shaft is rotated in a second direction.

2. The synchronous dynamoelectric machine of claim 1, further comprising:

a plurality of elastic coolant guides disposed in said interpolar spaces, said guides being tapered in the radial direction to reduce the axial flow area so as to cause axially-flowing elastic coolant to assume a high velocity along the field winding adjacent to said guide whereby the heat transfer rate between the field winding and elastic coolant is increased.

3. The synchronous dynamoelectric machine of claim 1, wherein said field winding has a plurality of fins which protrude circumferentially into said interpolar spaces to further facilitate heat transfer between said winding and said elastic coolant.

4. The synchronous dynamoelectric machine of claim 1 wherein said first and second blade series respectively comprise:

a first outboard and a first inboard section and
   a second outboard and a second inboard section wherein said outboard sections have compressing capability for either direction of shaft rotation and said inboard sections having compressing capabilities for opposite directions of shaft rotation.

5. The synchronous dynamoelectric machine of claim 4, wherein said outboard sections each comprise:
   a first, straight, stationary row of blades disposed at axially-opposite ends of said shaft;
   a first, straight, rotatable row of blades disposed axially adjacent said first straight stationary row and nearer said poles than said first, straight, stationary row;
   a second straight stationary row of blades axially disposed between said first, straight, rotatable row and said poles.

6. The synchronous dynamoelectric machine of claim 4, wherein said inboard sections each comprise:
   at least two rows of cambered blades disposed axially adjacent each other between one of said outboard sections and said poles wherein corresponding rows of cambered blades for said inboard sections have identical cords and oppositely-curved camber lines.

7. The synchronous dynamoelectric machine of claim 1, wherein the axial rows of said first and second series of blades nearest said poles are in fluid communication through said interpolar spaces while the axial rows of said first and second series of blades farthest from said poles are in fluid communication through a conduit.

* * * * *